June 21, 1932.  F. J. YOUNG  1,864,111
PIPE SLIP
Filed May 22, 1929  2 Sheets-Sheet 1

Inventor
Forrest J. Young
By Lyon & Lyon
Attorneys

June 21, 1932.    F. J. YOUNG    1,864,111
PIPE SLIP
Filed May 22, 1929    2 Sheets-Sheet 2

Inventor
Forrest J. Young
By Lyon & Lyon
Attorneys

Patented June 21, 1932

1,864,111

UNITED STATES PATENT OFFICE

FORREST J. YOUNG, OF TORRANCE, CALIFORNIA, ASSIGNOR, BY MESNE ASSIGNMENTS, TO THE NATIONAL SUPPLY COMPANY, OF TOLEDO, OHIO, A CORPORATION OF OHIO

PIPE SLIP

Application filed May 22, 1929. Serial No. 365,080.

This invention relates to pipe slips, and more particularly to a slip adapted for use in gripping a pipe for the purpose of either holding the same suspended or for rotating the same.

An object of this invention is to provide pipe slips formed of a plurality of segments connected together in a manner to form two semi-cylindrical slips, the portions of which are held together in a manner to permit a limited movement of the segments when the pipe is released.

Another object of this invention is to provide a pipe slip including a plurality of segments connected together by interlocking members formed on their adjacent faces and held in locked position by means of a liner secured to one of the segments.

Other objects and advantages of this invention it is believed will be apparent from the following detailed description of a preferred embodiment thereof illustrated in the accompanying drawings.

Figure 1:
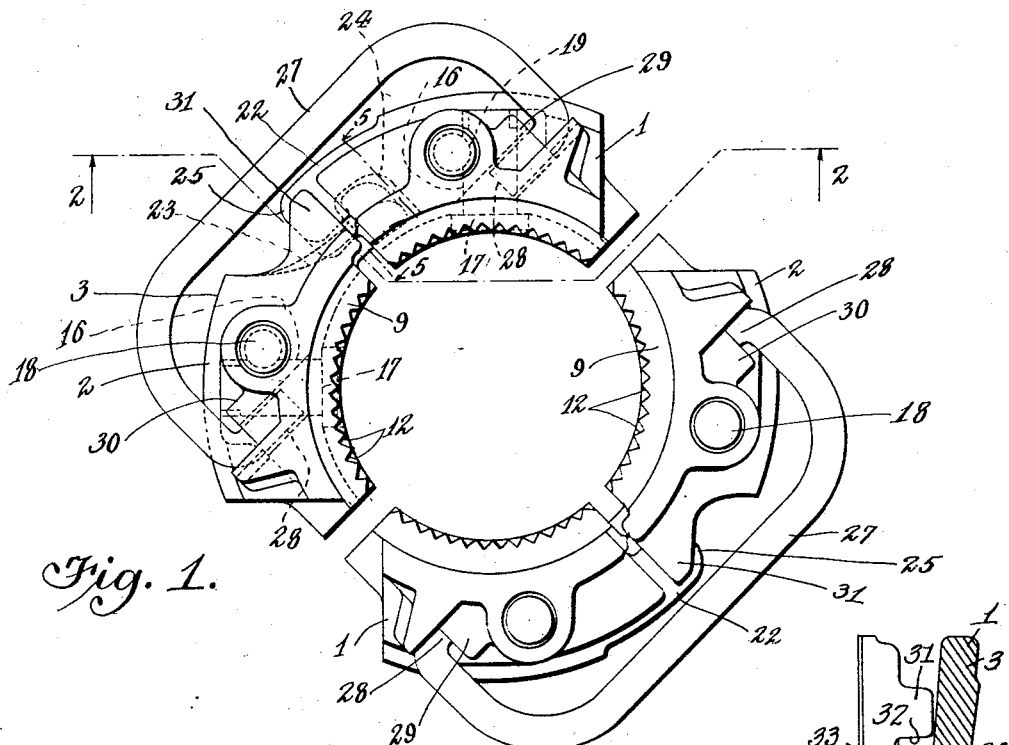
Figure 1 is a top plan view of a pipe slip embodying this invention.
Figures 4, 5:
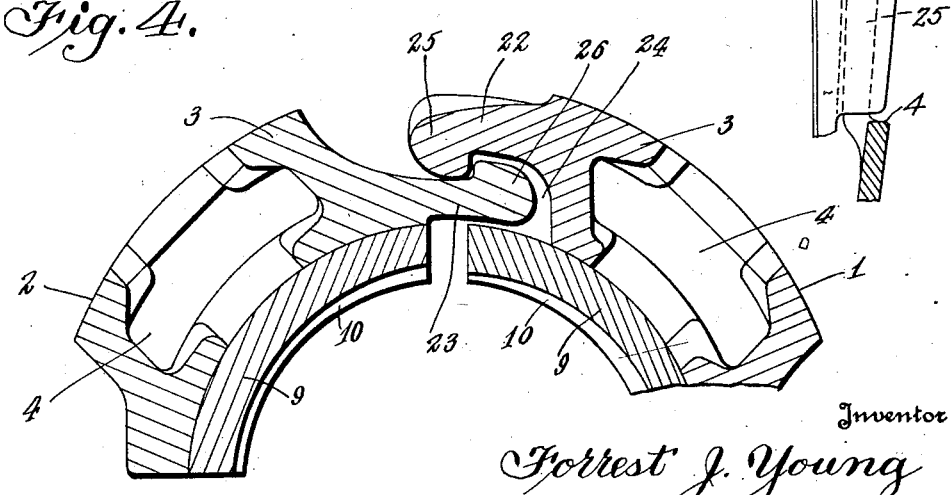
Figure 4 is a sectional top plan view taken substantially on the line 4—4 of Figure 2.
Fig. 5 is a sectional view taken on line 5—5 of Fig. 1 and illustrating the engagement of the slip connecting means embodied in this invention.
Figure 3:
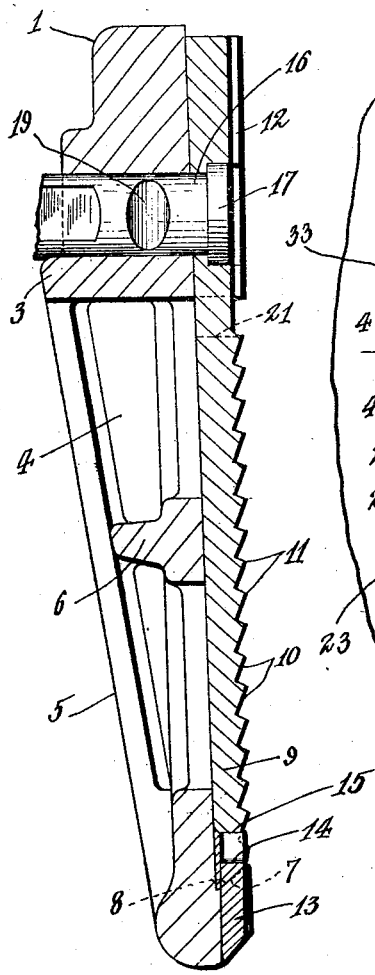
Figure 3 is a sectional side elevation taken substantially on the line 3—3 of Figure 2.
Figure 2:
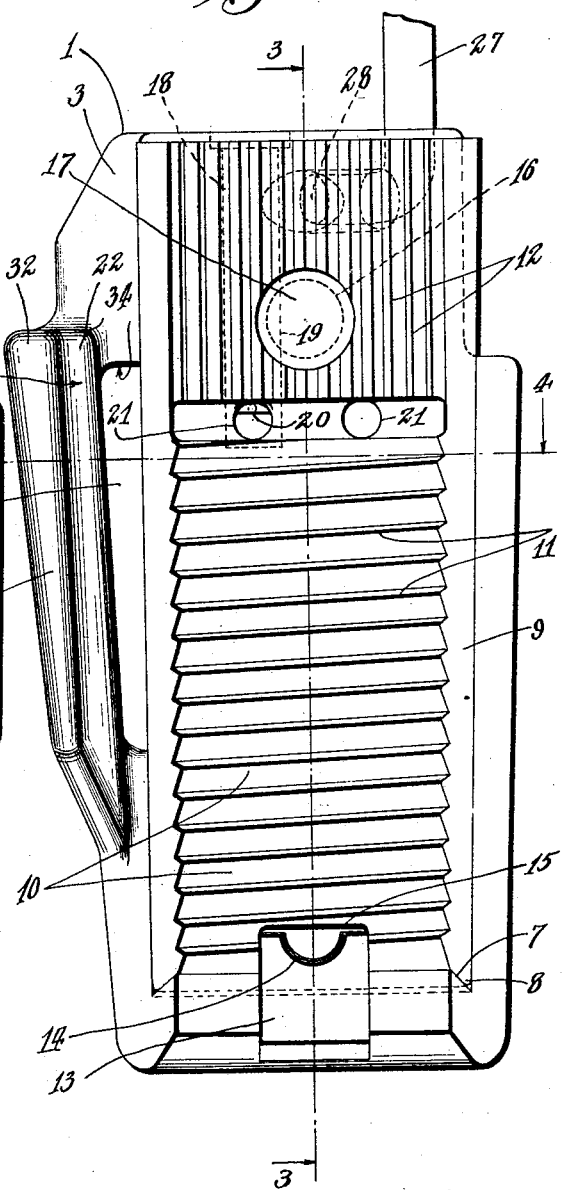
Figure 2 is a front elevation of one of the pipe slip segments embodied in this invention. A fragment of the mating segment is also shown in this figure.

In the preferred embodiment of this invention illustrated in the accompanying drawings, 1 indicates a segmental pipe slip and 2 a second segmental pipe slip, the segments 1 and 2 being connected together to form a substantially semi-cylindrical pipe slip. Two pair of segmental pipe slips 1 and 2 are provided to form a complete pipe slip. My invention may, however, be embodied in a pipe slip formed of more than two pair of such segmental slips connected together in substantially the same manner.

Each of the segmental slips 1 and 2 is substantially of the same construction in that it includes a body 3 which is cored out as indicated at 4 to lighten its weight, and is tapered downwardly on its exterior periphery as indicated at 5 to fit within the tapered bore of a rotary machine, elevator or the like. The segmental slips are preferably formed of cast metal, and in order to provide sufficient rigidity in the structure, a central bridge 6 is formed spanning the cored-out portion 4 from the front surface of the slip segment to the rear thereof. At the lower portion each slip segment is formed with a downwardly tapered shoulder 7 into which the complementarily tapered end 8 of a liner 9 is fitted. The liner 9 is, by means of this shoulder 7, held from vertical displacement by the weight of the pipe.

Each of the liners 9 is provided with wickers 10 formed as thread segments and providing engaging teeth 11 for engaging the outer periphery of the pipe. Each of the liners 9 is also provided with vertically extending wickers 12 formed to enable the slips to grip the pipe and rotate the pipe when the pipe slip is rotated as in a rotary machine. In order to hold the lower end of the liner 9 from rotating relative to the body of the slip, a key 13 is provided at the lower end of the slip which is fitted within a cut-out formed in the body 3 and is welded into position. The key 13 is cut out as indicated at 14 in order to provide additional welding surface for firmly holding the key in position.

The liner 9 is provided with a substantially rectangular recess 15 at its lower end and the key 13 is slidingly fitted into this rectangular recess. A locking pin 16 is provided for holding the slip liner 9 from rotating relative to the body 3 at the upper end of the structure and for holding the liner 9 down against the shoulder 7. The locking pin 16 is provided with a head 17 which holds the liner 9 against the body 3. The head 17 is countersunk into the face of the liner 9 so as to be positioned below the wickers 12. The pin 16 is locked in position by means of a pin 18 which passes downwardly through a vertical bore formed from the upper end of the body 3 and through a cut-out recess 19 formed in the shank of the pin 16. The pin 18 passing through the recess 19 holds the lock pin 16 from either rotation or displacement. A cotter pin 20 is passed through a hole formed in the end of the pin 18 through a hole 21 formed through the liner 9.

Means are provided for connecting the slip segments 1 and 2 together to permit a limited pivotal movement and limited relative vertical and transverse displacements which means are preferably of the following construction:

Formed from the lateral face of the slip segment 1 is a vertically extending tongue 22. Formed from the inner face of the slip segment 2 is a corresponding tongue 23.

Formed inwardly from the face of the slip segment 1 is a recess 24 into which the tongue 23 is fitted. The tongues 22 and 23 have interlocking heads 25 and 26. The recess 24 is enlarged larger than the head 26 to permit the head 26 a slight pivotal movement and transverse movement in said recess.

When the liner 9 of the slip segment 1 is in position, it fits over the head 26 of the tongue 23, holding the head 26 within the recess 24, which permits the head 26 to move in said recess 24 allowing the slips both a limited pivotal movement relative to each other and a limited transverse movement.

When it is desired to separate the slip segments 1 or 2 or to originally connect the tongues 22 and 23, the liner 9 is removed from the body 3 by removing the cotter pin 20, the pin 18, and then the pin 16 and merely lifting the liner 9 from the body 3 of the slip 1.

As the slip segments 1 and 2 when connected together form a completed semi-cylindrical slip, a single handle 27 is provided. The handle 27 is formed as a bail and expands over the slip segments 1 and 2 and is provided at its ends with inwardly projecting trunnions 28 which fit within bosses 29 and 30 formed on the slip segments 1 and 2 respectively.

In order to limit relative vertical movement of the slip segments 1 and 2 there is provided extending from the lateral face of the segment 2 a shoulder member 31 which engages the upper end 34 of the tongue 22 when the segments 1 and 2 are connected. The upper end 33 of the tongue 26 also engages in this position the under edge 34 of the web connecting the tongue 25 to the body 3. Except for the spacing of these engaging members, no relative vertical movement of the segments would be permitted. It is preferable to permit a slight movement to avoid machining of the engaging members and permit easy assembling. The slight vertical movement also permits the slip segments to engage and disengage from the pipe readily.

Having fully described my invention, it is to be understood that I do not wish to be limited to the details herein set forth, but my invention is of the full scope of the appended claims.

I claim:

1. In a liner slip, the combination of two or more slip segments, means for detachably connecting the said slip segments together at their lateral edges, and a liner secured to one of said slips for holding said detachable connecting means engaged.

2. In a liner slip, the combination of two or more slip segments, means for detachably connecting the said slip segments together, a liner secured to one of said slips and holding said detachable connecting means engaged, and a handle connected at its ends to the independent slip segments.

3. In a pipe slip, the combination of two or more segments, means secured to the adjacent lateral edges of said slip segments and adapted to be engaged for holding the said segments detachably connected, and a liner secured to one of said segments for holding the first said means engaged.

4. In a slip liner, the combination of two or more slip segments, means for detachably connecting said segments together at their adjacent lateral edges to permit a limited relative pivotal movement of said segments, means for holding the segments from relative vertical movement, and a liner secured to one of said segments for holding said detachable connecting means engaged.

5. In a pipe slip, the combination of a body having a tapered exterior periphery and a substantially vertically extending inner periphery terminating in a shoulder, a key welded to the body, a liner mounted on the inner periphery of the body over said key and in engagement with said shoulder, a lock pin passed through the liner and the body at a point near the upper end, and a substantially vertically extending pin passing through a bore formed in the body and a cut-out portion of said lock pin to hold said lock pin in position.

6. In a pipe slip, the combination of a pair of slip segments, a tongue extending from the lateral edge of one of said slip segments, a tongue extending from the adjacent lateral edge of the other of said slip segments and fitting in a recess formed in part in the first mentioned tongue, and a liner secured to the face of the first said slip segment and partly closing said recess to hold the said tongues in engagement.

7. In a pipe slip, the combination of a pair of slip segments, a tongue extending from the lateral edge of one of said slip segments, a tongue extending from the adjacent lateral edge of the other of said slip segments in position to engage the first said tongue to hold the said slip segments from relatively spreading apart laterally, means secured to the face of one of said segments for holding the said tongues in engagement, and means secured to one of said slip segments and adapted to engage the upper end of the tongue of the other of said slip segments to hold the segments from relative vertical movement.

8. In a pipe slip, the combination of a pair of slip segments, a tongue extending from the lateral edge of one of said slip segments, a tongue extending from the adjacent lateral edge of the other of said slip segments in position to engage the first said tongue to hold the said slip segments from relatively spreading apart laterally, means secured to the face of one of said segments for holding the said tongues in engagement, means secured to one of said slip segments and adapted to engage the upper end of the tongue of the other of said slip segments to hold the segments from relative vertical movement, and a handle connected at its ends to the independent slip segments.

9. In a device of the class described, the combination of two or more slip segments, interlocking means extending adjacent the ends of said segments for connecting said segments together, means for holding said segments from relative vertical displacement, and means secured to one of said slip segments for detachably holding said interlocking means engaged.

10. In a slip liner, the combination of two or more slip segments, means for detachably connecting said segments together at their adjacent lateral edges to permit a limited relative pivotal movement of said segments, means for holding the segments from relative vertical movement, and a liner secured to one of said segments and adapted to engage the means for detachably connecting said segments together for holding said detachable connecting means engaged.

11. In a pipe slip, the combination of two or more segments, interlocking heads projected laterally from the adjacent edges of said slip segments and adapted to be engaged to hold said segments detachably connected together, and a liner detachably secured to one of said segments for holding the said interlocking heads engaged.

12. In a slip, the combination of two or more segments, means secured to the lateral edges of said segments and adapted to be engaged for holding the said segments detachably connected, means secured to one of said segments spaced from its detachable connecting means for engaging the other of said segments to cooperate with the detachable connecting means of the said segments to prevent relative vertical displacement, and a liner detachably secured to one of said segments for holding the first said means engaged.

13. In a pipe slip, the combination of two or more segments, interlocking heads secured to the adjacent lateral edges of said slip segments and adapted to be engaged for holding the said segments detachably connected and providing interengaging shoulders adapted to prevent relative vertical displacement of said segments, and a liner secured to one of said segments for holding the said interlocking heads engaged.

14. In a pipe slip, the combination of a pair of slip segments, a tongue extending laterally from the edge of one of said slip segments, a tongue extending from the adjacent lateral edge of the other of said slip segments in position to engage the first said tongue to hold the said slip segments from relative spreading apart laterally and providing spaced shoulders to prevent relative vertical displacement of said slip segments, and means detachably secured to the face of one of said segments for holding the said tongues in engagement.

Signed at Torrance, Calif., this 9th day of May, 1929.

FORREST J. YOUNG.